United States Patent [19]
Boyer

[11] Patent Number: 5,100,651
[45] Date of Patent: Mar. 31, 1992

[54] HEALTH PRODUCT, IN PARTICULAR FOR THE CARING OF THE TEETH OF DOGS

[76] Inventor: Danielle Boyer, 23, Quai le Gallo Boulogne (hauts de Seine), France

[21] Appl. No.: 128,044

[22] Filed: Dec. 3, 1987

[30] Foreign Application Priority Data

Dec. 5, 1986 [FR] France ................... 86 17053

[51] Int. Cl.$^5$ ............ A61K 47/00; A61K 33/16; A61K 31/02; A61K 33/42
[52] U.S. Cl. .................... 424/52; 424/49; 424/58; 424/442; 426/3; 426/802; 426/805; 514/835
[58] Field of Search .............. 424/49, 52, 58, 442; 426/802, 805, 3; 514/835

[56] References Cited

U.S. PATENT DOCUMENTS

| | | | |
|---|---|---|---|
| 3,882,257 | 5/1975 | Cagle | 426/805 |
| 4,001,393 | 1/1977 | L'Orange | 424/52 |
| 4,145,447 | 3/1979 | Fisher et al. | 426/72 |
| 4,419,372 | 12/1983 | Greene et al. | 426/104 |
| 4,554,154 | 11/1985 | White | 424/52 |
| 4,702,929 | 10/1987 | Lehn et al. | 426/805 |
| 4,724,136 | 2/1988 | Scheibl | 426/805 |
| 4,735,808 | 4/1988 | Scaglione et al. | 426/805 |
| 4,822,626 | 4/1989 | Spanier et al. | 426/805 |
| 4,880,642 | 11/1989 | Berends | 426/456 |

FOREIGN PATENT DOCUMENTS 3426203 11/1985 Fed. Rep. of Germany .
3422464 12/1985 Fed. Rep. of Germany .
0221044 11/1985 Japan .

OTHER PUBLICATIONS

Klimenko, Chem. Abst., vol. 92, 67(1980), abst. No. 52106h.

Primary Examiner—Ronald W. Griffin
Attorney, Agent, or Firm—Kuhn and Muller

[57] ABSTRACT

Health product, in particular for the caring of the teeth of a dog, constituted by a support incorporating or having absorbed various watersoluble active elements or constituents, this support being made from a natural or synthetic digestible material suitable for being gnawed, chewed or licked by the dog.

2 Claims, No Drawings

HEALTH PRODUCT, IN PARTICULAR FOR THE CARING OF THE TEETH OF DOGS

The present invention relates to a product for the caring of the teeth of a dog or other domestic animal of the same type by providing it with controlled doses of elements having a given activity so as to effectively combat in particular dental decay, microbial flora which develops in the hard layer termed dental plaque lining the anterior wall of the teeth, and tartar or calcareous deposits encrusted between the teeth.

It is known that the dental health of dogs or other similar domestic animals is often deficient owing to the impossibility of achieving an effective brushing of their teeth with suitable dental products in a way comparable to the use thereof on the part of human beings.

The present invention concerns a health product capable of being chewed, gnawed or licked by the dog so as to provide it with elements required for adequate dental health in a form acceptable to the dog.

For this purpose, the considered product is characterized in that it is constituted by a support incorporating or having absorbed various watersoluble active elements or constituents, said support being made of a natural or synthetic digestible substance which may be gnawed, chewed or licked by the animal.

According to a preferred embodiment of the invention, the active elements absorbed by the support are selected, together or separately, from anti-decay agents such as fluorine-containing salts, anti-microbial agents for action against bacterial flora developed in the dental plaque and anti-tartar agents.

Advantageously, the active elements may also be associated with flavouring agents or aromas which arouse the desire and interest of the animal for the product.

In a particular embodiment of the considered product, the active elements are preferably constituted: as anti-decay agents, by flourine-containing salts such as sodium flouride, monofluorophosphate of sodium or other fluorine-containing salts alone or in a mixture, as an anti-microbial agent, by bromchlorophene, and, as an anti-tartar agent, by sodium benzoate.

According to the present invention, the health product suitable for chewing by the dog contains the following proportions of active elements, between 0.007 and 0.060% fluorine ions, between 0,005 and 0.045% antimicrobial agents such as bromchlorophene, between 0.060 and 0.540 % antitartar agents.

According to another feature of the product according to the invention, the support is formed by a piece or strip of oxhide suitably cut up. As a modification, the support is formed by the tendon of the neck of the ox or by any other relatively supple but strong material, optionally digestible, that the animal may chew or gnaw at will and cause the release of the incorporated active elements by a repeated mechanical effect in a salivary medium comparable to an effective brushing.

To produce the health product according to the invention, the procedure is preferably the following:

The support is first of all immersed in an aqueous solution having a concentration of active elements in a given proportion during a period of approximately 48 hours so as to cause the support to be impregnated by or to absorb these elements, then this support is dried in an oven at about 37° C. for 24 hours to cause the evaporation of the water and the support is put into shape, for example by rolling it or shaping to a profile similar to a bone to gnaw or any other object likely to interest the animal, such as for example a cutlet, a shoe or small animal, etc. Preferably, the support is immersed in a volume of the solution having a ratio of 10 to 1 by weight with the support.

In the case where the support is formed by strips of skin, the latter are cut up into elongated bands of variable weight depending on the size of the product to be produced, the skin usually being adapted to absorb the active elements contained in the solution in an amount substantially equal to about one and a half times their weight of solution.

The amounts of active elements in the support are thus exactly adjusted to present no risk to the animal even for a maximum daily utilization corresponding to a prolonged chewing and ingestion of the product.

A particular manner of producing the health product according to the invention is given hereinafter.

First of all a series of skin strips cut in elongated form from a piece of oxhide is prepared, these strips each having a weight of about 10 grams to within about 10%.

These strips are then immersed in a suitably prepared solution containing for about 1 liter of solution 0.30 g of sodium fluoride, 1.20 g of sodium benzoate, 0.10 g of bromchlorophene and a flavouring representing about 8.40 g. The complement, namely 990.00 g, is provided by pure water. The strips of skin immersed in the solution are gradually impregnated with the active elements contained in the latter until these skins become saturated with about one and a half times their weight of solution.

The wet skins are then dried in an oven at about 37° C., then shaped in accordance with a suitable profile, recalling the shape of a bone which the animal will be able to chew or gnaw at will while gradually absorbing the aforementioned active elements which will ensure a suitable health of its teeth.

The bone obtained in this way contains for a weight of 10 g, 0.020% fluorine ions, 0.015% bromchlorophene and 0.180% sodium benzoate.

It will be understood that the scope of the invention is not limited to the example more particularly envisaged hereinbefore; on the contrary, it encompasses all variations, in particular as concerns the nature of the active elements incorporated in the support and the relative proportions of these elements.

In particular, it is possible to prepare according to the present invention bones and other products to be chewed and gnawed of a size and weight adapted to the size of the dogs for which they are intended.

The products of the invention of a weight of 10 g are normally intended for small dogs. Products of about 30 g containing a higher suitable content of active elements may be prepared for large dogs.

I claim:

1. A chewing article suitable for the caring of the teeth of a dog, comprising a support having incorporated therein by immersion for approximately 48 hours and drying by exposure to temperatures not to exceed 98.6° F. (37° C.) an amount of at least one watersoluble active element selected from anti-decay agents consisting of sodium fluoride, a monofluorophosphate of sodium, or a mixture thereof, and the content of fluoride ions of the chewing article is between 0.007 and 0.060%, anti-microbial agents suitable for combatting bacterial flora developed in dental plaque consisting of bromochlorophene included in the chewing article in a proportion of between 0.005 and 0.045%, anti-tartar agents and mixtures of the same consisting of sodium benzoate included in the chewing article while in a proportion of between 0.060 and 0.540%, said support being made from a natural or synthetic substance consisting of animal skin, animal tendons or other strong supple animal materials in the form of a bone having a weight ranging between 10 g and 40 g suitable for gnawing, chewing or licking by the animal.

2. A process for preparing a chewing article according to claim 1 which comprises cutting out strips of animal skin, impregnating the strips by immersing said strips in an aqueous solution of at least one active element selected from an anti-decay agent consisting of sodium fluoride, a monofluorophosphate of sodium, or a mixture thereof and the content of fluoride ions of the chewing article is between 0.007 and 0.060%, and antimicrobial agent suitable for combatting bacterial flora developed in dental plaque consisting of bromochlorophene included in the chewing article in a proportion of between 0.005 and 0.045% and an anti-tartar agent consisting of sodium benzoate included in the chewing article in a proportion of between 0.060 and 0.540%, said active element having effective dental health properties in a concentration to about one percent by weight, allowing said strips to slowly immerse in said solution until said strips are saturated with one and a half times their weight of solution for a period of approximately 48 hours, the strips being in proportion by weight of 1 to 10 with the solution, drying said strips at a temperature not to exceed 37° C. to evaporate the water of the solution, and then shaping these strips to form an object suitable for being gnawed, chewed or licked by the dog.

* * * * *